US007788788B2

(12) United States Patent
Sullivan

(10) Patent No.: US 7,788,788 B2
(45) Date of Patent: Sep. 7, 2010

(54) TOOL FOR INSERTION OR REMOVAL OF ELECTRICAL CONNECTORS

(76) Inventor: Robert W Sullivan, SullStar Technologies, Inc., 3310 Los Nogales Rd., Simi Valley, CA (US) 93063

( * ) Notice: Subject to any disclaimer, the term of this patent is extended or adjusted under 35 U.S.C. 154(b) by 580 days.

(21) Appl. No.: 11/728,990

(22) Filed: Mar. 27, 2007

(65) Prior Publication Data

US 2007/0251086 A1 Nov. 1, 2007

Related U.S. Application Data

(60) Provisional application No. 60/789,810, filed on Apr. 5, 2006.

(51) Int. Cl.
*B23P 23/00* (2006.01)

(52) U.S. Cl. .......................... 29/566.4; 29/748; 29/749; 29/750; 29/751; 29/764

(58) Field of Classification Search ................ 29/566.4, 29/748, 750, 751, 720, 749, 764; 439/395; 81/463, 124.2; 72/453.15, 407, 477; 7/107, 7/158

See application file for complete search history.

(56) References Cited

U.S. PATENT DOCUMENTS

| | | | | |
|---|---|---|---|---|
| 4,161,061 | A | 7/1979 | Mason et al. | |
| 4,241,496 | A * | 12/1980 | Gregson | 29/751 |
| 5,161,301 | A * | 11/1992 | Kilsdonk | 29/739 |
| 5,604,948 | A | 2/1997 | McMahon et al. | |
| 6,708,396 | B2 * | 3/2004 | Holliday | 29/751 |
| 6,712,647 | B2 * | 3/2004 | Khemakhem et al. | 439/620.03 |

* cited by examiner

*Primary Examiner*—Derris H Banks
*Assistant Examiner*—Tai Nguyen
(74) *Attorney, Agent, or Firm*—Gene W. Arant

(57) ABSTRACT

A drive tool that may be attached to a driven tool which has a drive head, a shank, a tool body, and a longitudinal slot in the drive head whose upper end portion is sloped to provide a ramp, the drive tool being adapted to be pushed downward into a hollow end of the driven tool to then become locked in place relative to the driven tool, both rotationally and longitudinally, so that the driven tool can then be driven forward and concurrently driven in either a clockwise or a counter-clockwise rotation.

3 Claims, 8 Drawing Sheets

TOOL FOR INSERTION OR REMOVAL OF ELECTRICAL CONNECTORS

PRIORITY CLAIM

Figure 1C:
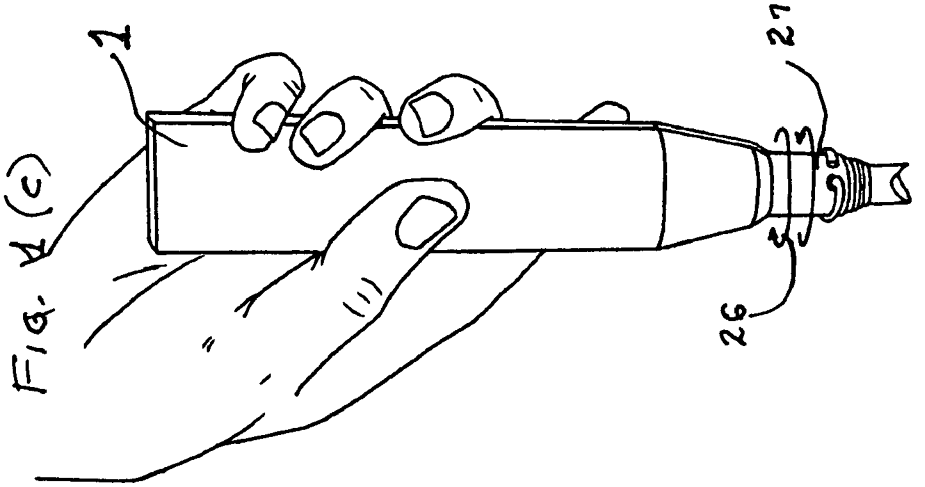

This application claims the priority of my Provisional Application Ser. No. 60/798,810 filed Apr. 5, 2006.

FIELD OF THE INVENTION

The field of this invention is tools for electricians or other electrical workers.

BACKGROUND OF THE INVENTION

Coaxial cable has an inner conductor which is inside a cylindrical outer conductor. Both of the conductors are made of metal, and the outer conductor operates to carry the electrical signals on its interior wall surface while shielding those signals from any external interference. A dielectric insulator separates the two conductors, keeping the inner conductor in a coaxial relation to the outer conductor and maintaining both the electrical insulation between and the mechanical spacing of the two conductors. The dielectric material may be a solid continuous member, or individual separate rings spaced longitudinally along the length of the cable.

To connect two sections of coax cable it is necessary to have a two-part connector, each of whose parts is permanently attached to one end of a section of the coax cable. Since coax cables are usually very small their connectors are also quite small. Working in confined spaces, an electrician needs a good hand tool to assist in assembling (inserting or attaching) or detaching (removing or disassembling) the various connector parts. Presently standard tools have a shank which locks into a driving handle with a quarter-turn twist. That kind of mechanism works for either inserting or removing a connector part, but not for both, because the rotating drive is effective in only one direction.

One standard connector for coax cables is known as a BNC connector. Developed in the late 1940's as a miniature version of a type C connector, BNC stands for Bayonet Neill Concelman and is named after Amphenol engineer Carl Concelman. The BNC product line features two bayonet lugs on the female connector member, and mating is achieved with only a quarter turn of the coupling nut. Another standard connector for coax cables is known as an F connector. Both mating parts of the connector have hexagonal surfaces which engage to provide support for rotating drive. For either type connector it is necessary to drivingly force a longitudinal movement of the part being attached or removed, as well as providing a rotating drive.

Applicant's prior U.S. patent application Ser. No. 11/175,466 entitled OPTIMAL SELECTABLE FORCE IMPACT TOOL filed Jul. 5, 2005, shows a punch-down tool for which the downward or longitudinal driving force can be conveniently adjusted. The present invention is accomplished by modifying Applicant's punch-down tool, and also providing a modification of each of the BNC and F type insertion/removal tools.

SUMMARY OF THE INVENTION

The objective of the invention is to be able to conveniently connect, or disconnect, two longitudinal sections of coaxial cable. According to the present invention the drive head of the insertion or removal tool is longitudinally inserted into a hand tool such as a punch down tool, and is locked in place against both rotational and longitudinal movement. A punch down tool such as that shown in Applicant's prior application is modified to provide a cylindrical lower driving end, upon whose outer surface a circumferential groove is formed. A locking spring carried in the circumferential groove extends around most of the circumference of the punch down tool driving end. At one point along the circumferential groove there is a single hole through the wall, and the spring has an in-turned end which will engage the hole and be locked in it.

A removal tool is modified by forming in its drive head a longitudinal slot that has an upper end portion sloped to provide a ramp, and a lower end portion indented to form a detent. As the head of the removal tool is pushed upward into the hollow end of the punch-down tool driving end, the longitudinal slot in the drive head of the removal tool receives and engages the inturned end of the spring. Alternatively, the punch-down tool hollow lower driving end is pushed downward against the head of the removal tool into the longitudinal slot in the drive head of the removal tool, which receives and engages the inturned end of the spring. When the spring end point passes the high point in the slot (peak of the ramp of the removal tool) and drops down into the indentation (detent), the removal tool is then locked in place relative to the punch down tool driving end, rotationally and longitudinally. Now the tool assembly can be effectively used to either insert or remove a connector.

DRAWING SUMMARY

Figure 1B:
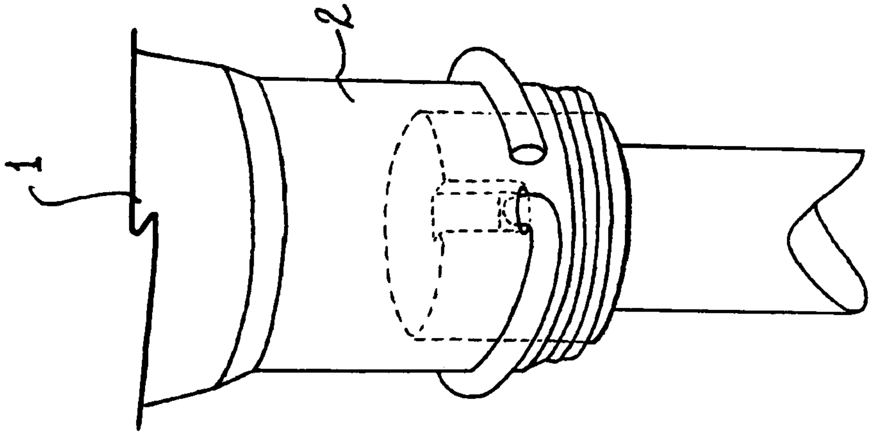
Figure 1A:
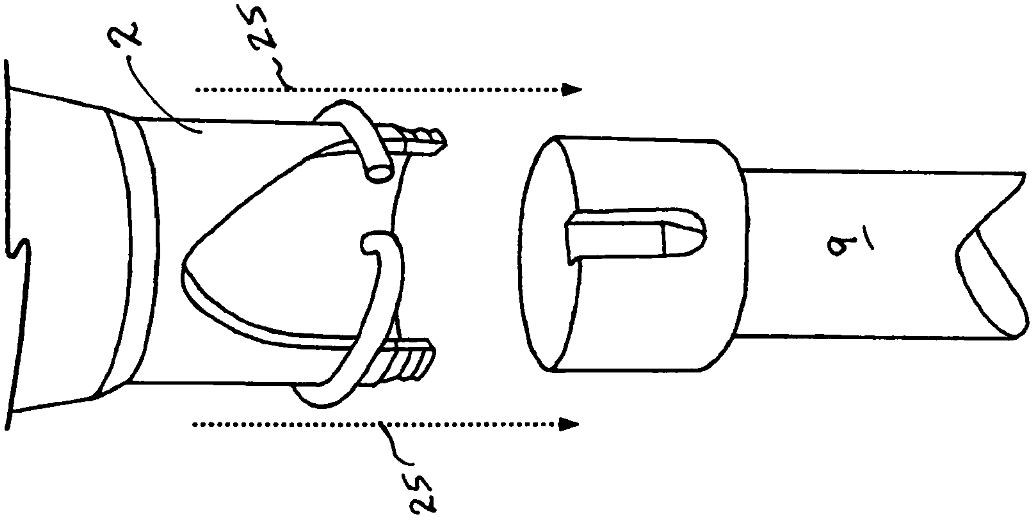

FIGS. 1*a*, 1*b*, and 1*c* provide an artistic illustration of the manner in which the tool system of the present invention operates;

FIGS. 2*a*, 2*b*, 3, 4*a*, 4*b*, 4*c*, 4*d*, 4*e*, 5*a*, and 5*b* illustrate the application of the invention to a BNC Removal Tool; and FIGS. 6*a*, 6*b*, 7, 8*a* and 8*b* illustrate application of the invention to an F Connector Removal Tool.

PART NUMBERS AND NAMES

The Part Numbers and Names are as follows:

1. Punch Down Tool
2. Driving Head of punch down tool 1
3. Circumferential groove in tool head 2
4. Detent Spring
5. Radial hole in bottom of groove 4
6. In-turned end of spring
7. BNC Connector, Female part
8. BNC Connector, Male Part
9. BNC Connector Insertion/Removal tool
10. F Connector, FIG. 5*a*
11. Drive head of BNC insertion/removal tool 1
12. Shank of BNC Removal Tool 1
13. Tool body of BNC Connector
14. Tapered ramp in drive head 11
15. Detent or depression at end of ramp
16. Tapered friction surface in tool body 13
17. Coaxial Cable, outer conductor
18. Coaxial Cable, inner conductor
19. F Connector Removal tool.
20. Drive head of F connector removal tool 19
21. Tool Body of F Connector tool 19
22. F Connector
23. Hex engagement surfaces of Tool 19
25. Arrows for downward movement
26. Arrow for clockwise rotation
27. Arrow for counter-clockwise rotation

DETAILED DESCRIPTION OF PREFERRED EMBODIMENT

We now refer to drawings 1*a*, 1*b*, 1*c*, 2*a*, 2*b*, 3, 4*a*, 4*b*, 4*c*, 4*d*, 4*e*, 5*a*, 5*b*, 6*a*, 6*b*, 7, 8*a*, and 8*b* (eight drawing sheets) which collectively show both an insertion or removal tool 9 for a BNC Type Connector and an insertion/removal tool 19 for an F Type Connector.

Figure 2B:
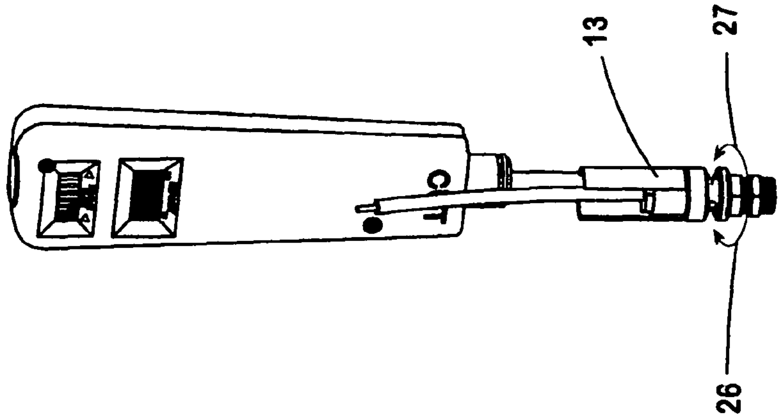
Figure 2A:
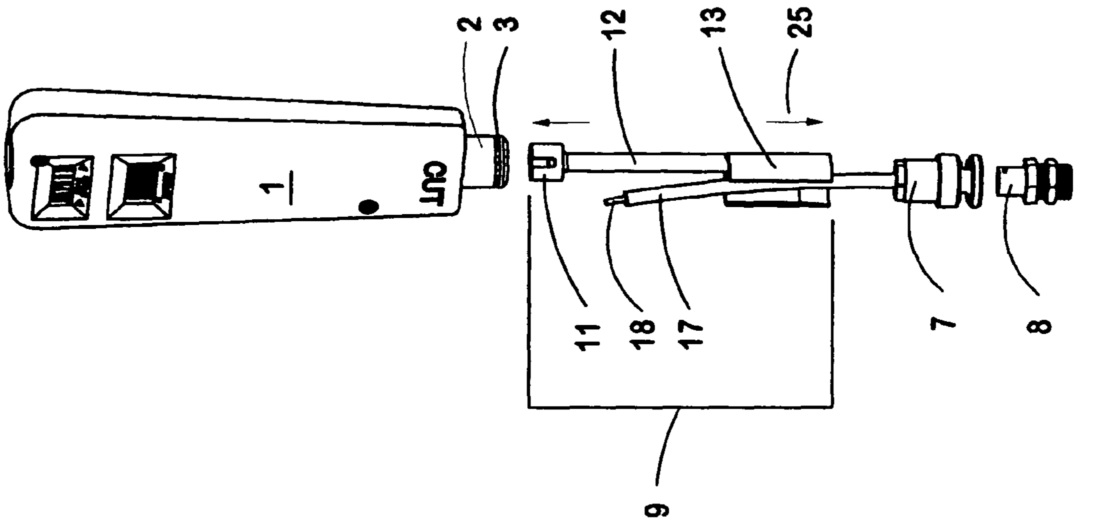

With reference to FIG. 2*a*, Item 1 is a punch-down tool such as disclosed in Applicant's prior application Ser. No. 11/175,466 entitled OPTIMAL SELECTABLE FORCE IMPACT TOOL filed Jul. 5, 2005, which is incorporated herein by reference. That application shows a punch-down tool for which the downward or longitudinal driving force can be conveniently adjusted. Item 2 is a hollow cylindrical lower driving end of tool 1 upon whose outer surface a circumferential groove 3 is formed.

Item 9 is a BNC Connector Removal/Insertion tool. Its driving head is number 11, shank is 12, and tool body is 13. Item 17 is the outer conductor of a coax cable, the inner conductor being item 18. The lower end of the coax is secured in the female part 7 of a BNC type connector. The male half of the connector is item 8. The numeral 12 is the stem or handle of a tool 9, which is a BNC connector/removal tool. Numeral 13 is the tool body or three-quarter cylindrical shield that has to surround the coax cable section 17, 18 during operation of the tool. One section of coax cable extends upward from female member 7 of a BNC connector; member 8 is the male member, attached to another section of coax cable, not shown in the drawing. FIG. 2*b* shows the two members of the connector being attached by a rotating movement of the tool body 13.

Figure 3:
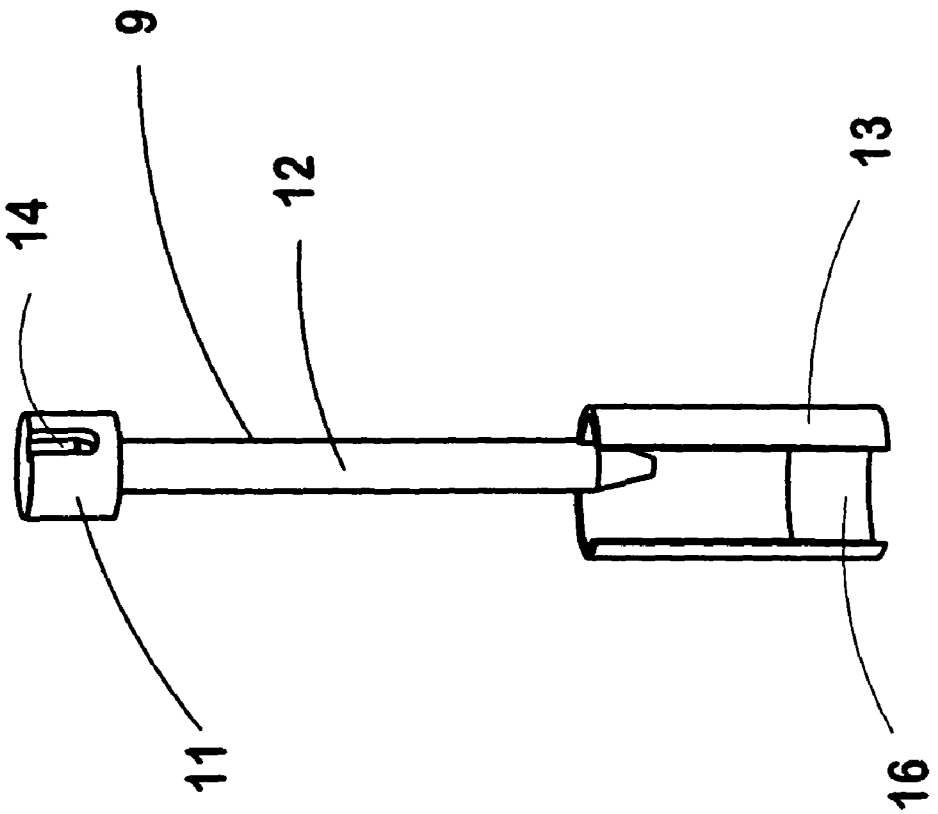

Referring to FIG. 3, numeral 16 is the longitudinally tapered internal friction surface of tool body 13 of tool 9.

Figures 4A, 4B, 4C, 4D, 4E:
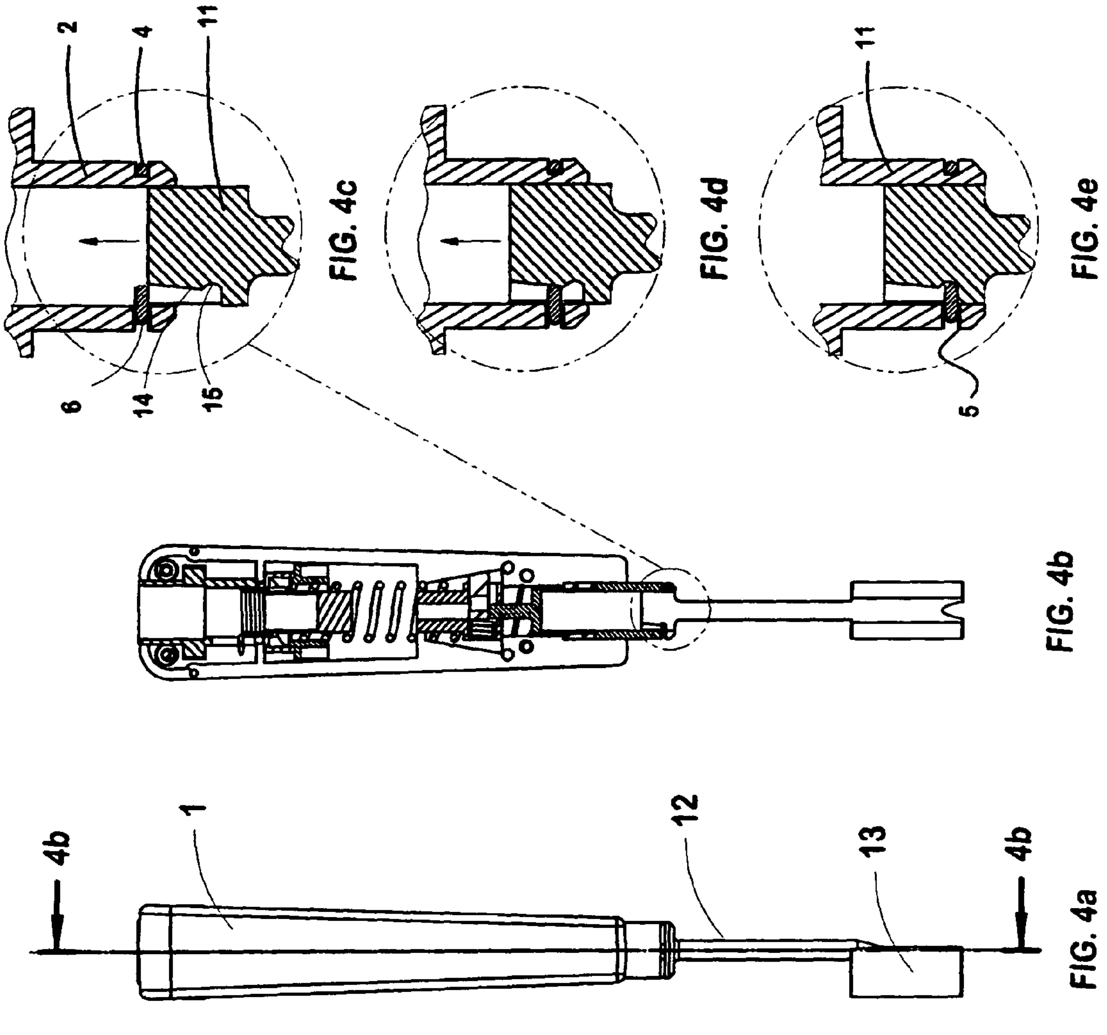
Figures 5A, 5B:
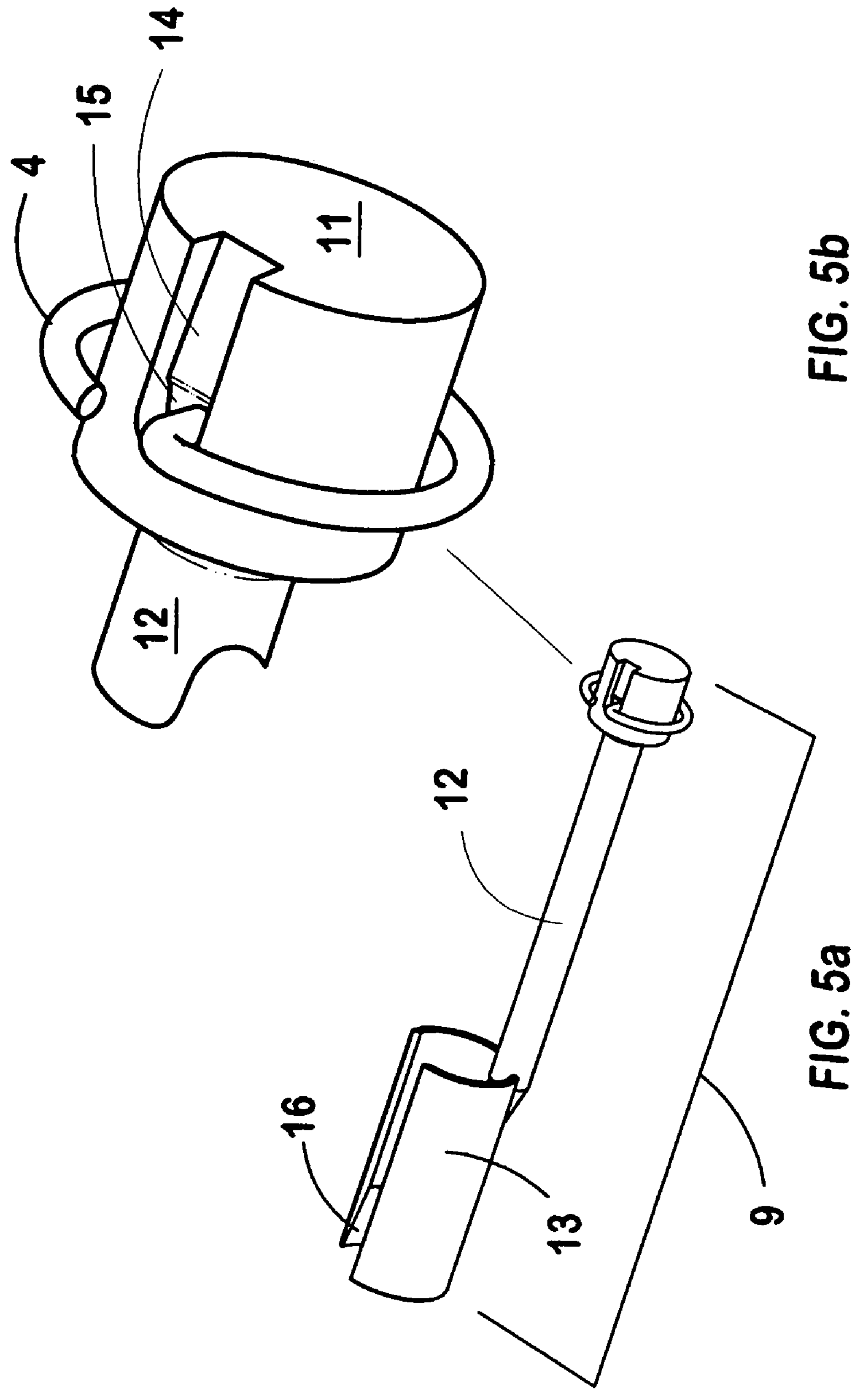
Figure 6B:
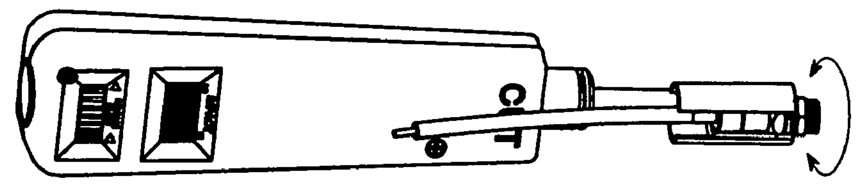
Figure 6A:
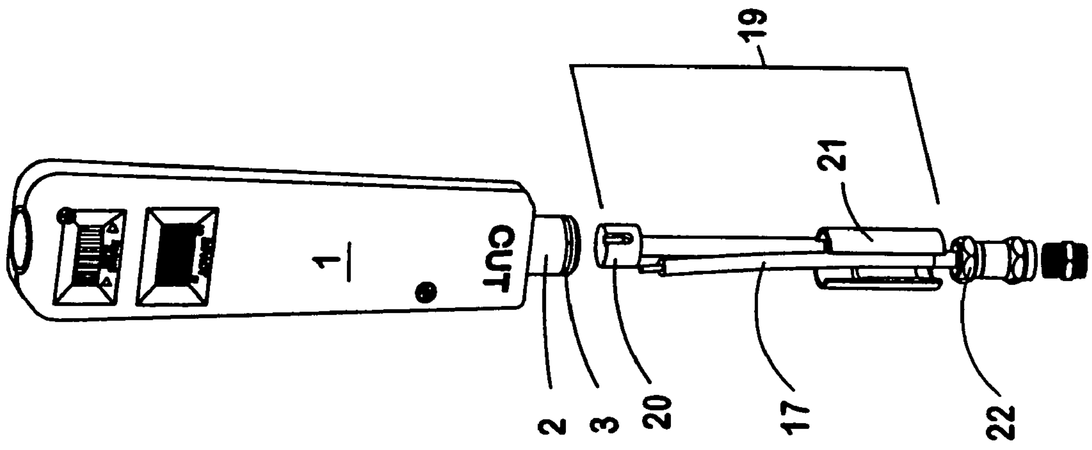

Referring to FIG. 4, shank 12 and tool body 13 are as referred to above. Part 11 is the drive head of tool 9, which has tapered ramp 14 and depression or detent 15. The radial hole in the wall of driving head 2 of tool 1 is labelled 5, shown in all of FIGS. 4*c*, 4*d*, and 4*e*. Those figures also show the progression of movement as the drive head 11 of the removal tool 9 is pushed upward into the hollow end of the punch-down tool driving end 2, the slot in the drive head 11 engages the spring end 6, and when the spring end point passes the high point of the ramp in the slot and drops down into the indentation 15 in the slot as shown in FIG. 3*e*, the removal tool 9 is then locked in place relative to the punch down tool driving end 2 both rotationally and longitudinally. The removal tool 9 can then be used to drivingly insert its tool body 13 into a connector part and can be drivingly rotated for either inserting or removing the connector part.

FIG. 4*b* shows that the ramp which engages the inturned end of spring 4 has a peak at about ¾ or ⅞ of its length. The spring is held by punch-down tool 1. The head of the BNC connector tool 9 is inserted longitudinally up into the opening in the lower end of tool 1. The inturned end 6 of spring 4 rides up the longer and more gently sloped portion of the ramp 14; then passes the peak; and then clicks further into the radial hole 5 described above. When the spring clicks in, the stem or handle is not only locked in a longitudinal direction, but also against rotation in either direction. Now you can either connect or disconnect the BNC connector.

Referring to FIG. 5, they show an enlargement of the removal tool 9. Also shown is the manner in which spring 4, carried by hand tool 1, 2, will engage the ramp 14 and detent 15.

Figure 7:
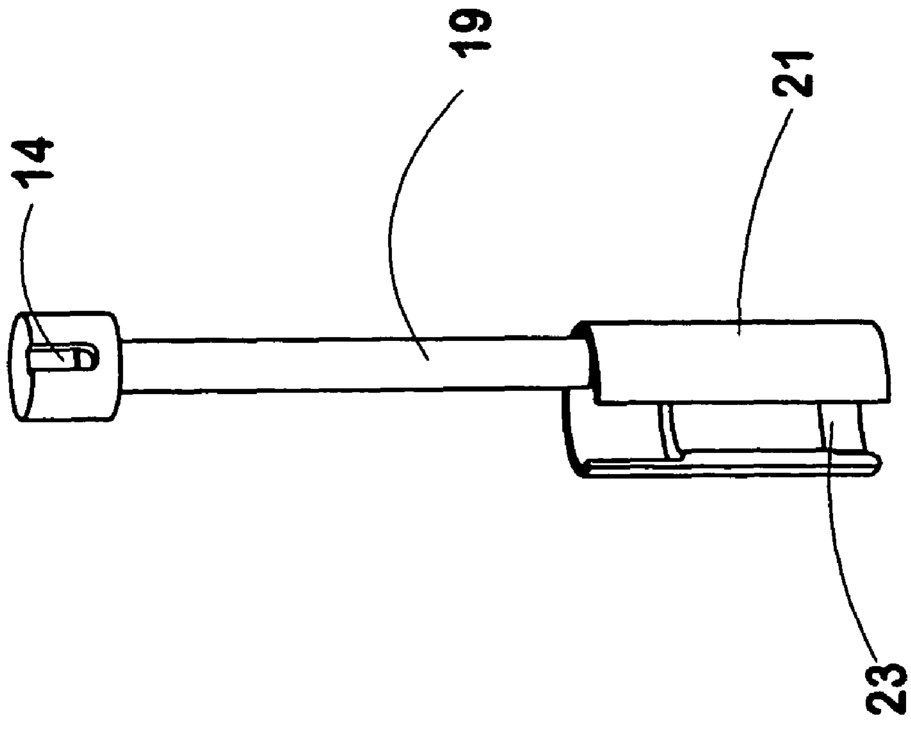
Figure 8B:
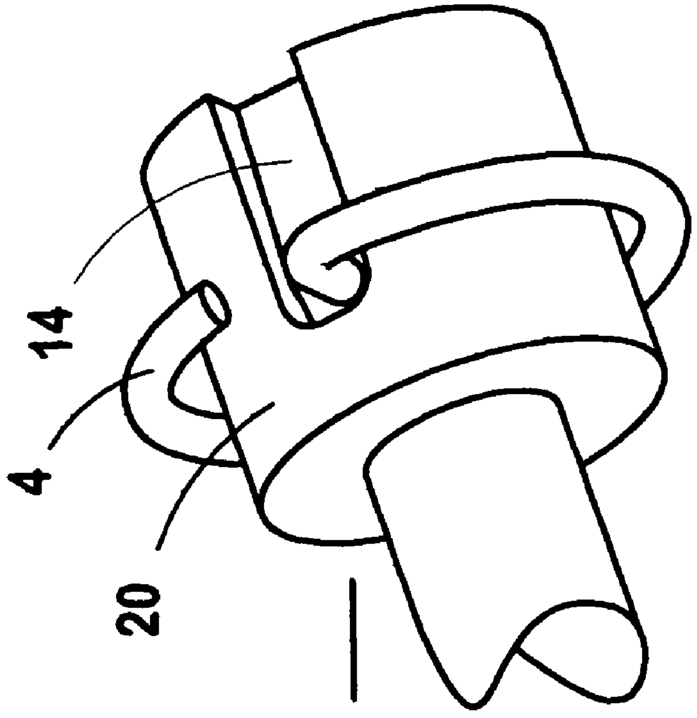
Figure 8A:
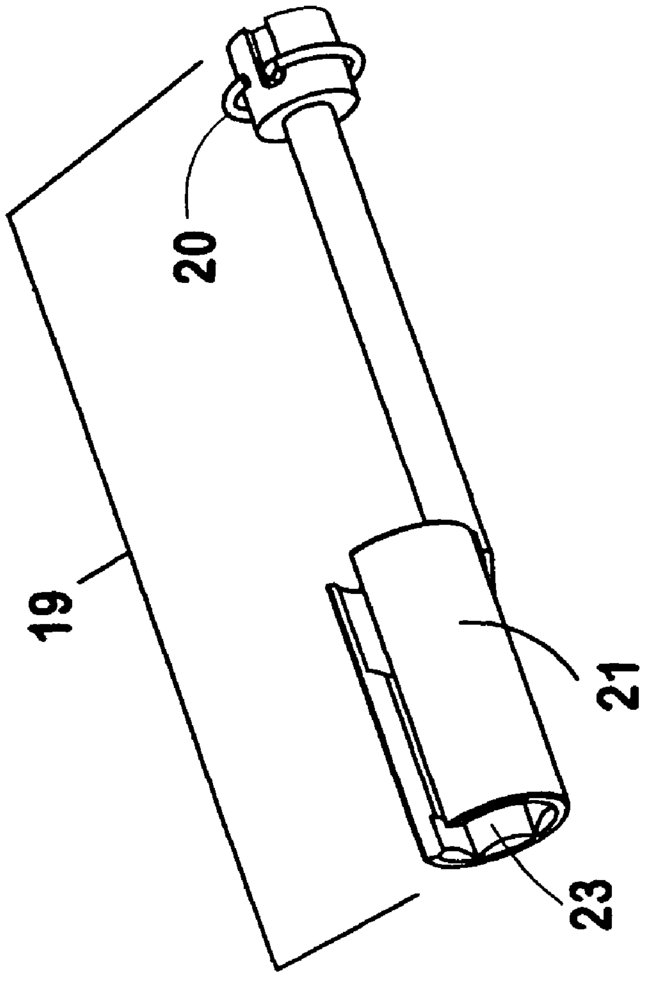

FIGS. 6, 7, and 8 show the invention as applied to a tool 19 for insertion or removal of an F Connector part. Tool body 21 has an internal hexagonal surface 23 which engages the hexagonal surface 22 of an F Connector part. Parts 4 and 14 are numbered as before, since the drive head 20 of the F Connector removal tool 19 is made just like the drive head 11 of BNC removal tool 9.

FIGS. 1*a*, 1*b*, and 1*c* artistically illustrate the operation of the present invention. Arrows 25 indicate that the driving tool 1 may have its hollow lower driving head 2 forced against the upper end 11 or 20 of an insertion/removal tool. Arrows 26 and 27 indicate that the driving tool 1 may be used to rotate the driven tool, 11 or 20, in either direction of rotation.

While this mechanical technique is shown applied to a particular kind of tool, it may also be used for other tools which require this type of drive; that is, the ability to apply force longitudinally downward, and to drivingly rotate the driven tool in either direction of rotation while doing so.

Although the presently preferred forms of my invention have been disclosed herein, it will be understood that other modifications should be apparent to those skilled in the art, and that the scope of my invention is to be judged only by the appended claims.

What I claim is:

1. A tool system for selectively inserting or removing a small electrical connector part, comprising:

a punch-down hand tool having a lower driving end in the form of a hollow cylinder upon whose outer surface a circumferential groove is formed;

a locking spring disposed within the circumferential groove and extending almost around the circumference of the driving end of the punch-down tool;

the driving end of the punch-down tool also having a radial hole through its cylindrical wall at one point in the circumferential groove;

the spring having an inturned end which engages and enters the hole and is thereby locked in place in the circumferential groove, the spring end protruding inwardly of the cylindrical wall;

a removal or insertion tool having a normally upwardly extending drive head, a shank, and a tool body;

the drive head of the removal or insertion tool having an external longitudinal slot that has its upper end portion sloped to provide a ramp, and the lower end portion of the drive head ramp being indented to form a detent, there being a high point on the ramp intermediate to its upper end and the indentation;

the longitudinal slot in the drive head of the removal or insertion tool being adapted to slidingly receive and engage the inturned end of the spring; and the operation being such that as the drive head of the removal or insertion tool is pushed upward into the hollow end of the punch-down tool lower driving end, the slot in the drive head of the removal or insertion tool slidingly engages the spring end, and when the spring inner end passes the high point of the ramp in the slot and drops down into the indentation in the slot, the removal or insertion tool is then locked in place relative the punch-down tool driving end, so that the punch-down tool can then be manually actuated to drive the removal or insertion tool and its tool body both longitudinally and rotationally for either inserting or removing an associated connector part.

2. A tool system as in claim 1 wherein the removal or insertion tool is adapted to insert or remove a BNC connector, and wherein its tool body has a hollow cylindrical portion for frictionally engaging the cylindrical outer surface of a BNC connector part.

3. A tool system as in claim 1 wherein the removal or insertion tool is adapted to insert or remove an F connector, and wherein its tool body has a hollow hexagonal portion for engaging the hexagonal outer surface of an F connector part.

* * * * *